UNITED STATES PATENT OFFICE.

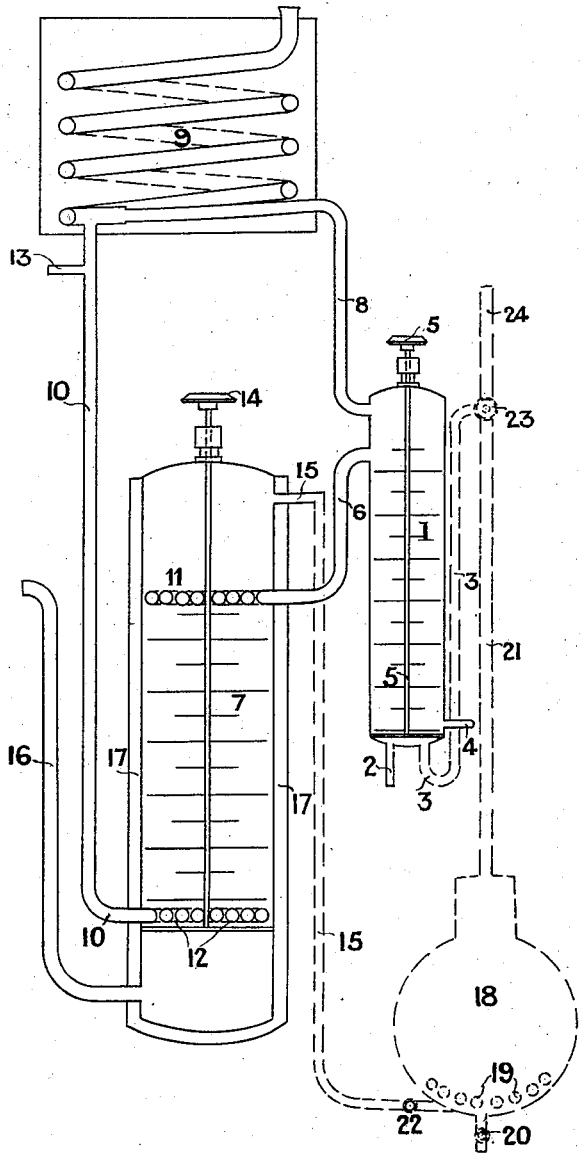

LOUIS CHARLES REESE, OF LONDON, ENGLAND.

PROCESS OF EXTRACTING MATTER FROM LIQUIDS BY SOLVENTS.

SPECIFICATION forming part of Letters Patent No. 744,795, dated November 24, 1903.

Application filed March 21, 1903. Serial No. 149,005. (No specimens.)

*To all whom it may concern:*

Be it known that I, LOUIS CHARLES REESE, doctor of philosophy, a subject of the Emperor of Germany, and a resident of London, England, have invented certain new and useful Improvements in Processes of Continuously Extracting Matter from Liquids by Solvents, of which the following is a specification.

This invention relates to the method of continuously extracting or separating from liquids matter therein contained by continuously mixing the liquid to be treated with a liquid of different specific gravity than and non-miscible to a homogeneous liquid with the liquid to be treated and suitable to serve as extracting medium or solvent for the matter to be obtained, while continuously adding fresh liquid to be treated and fresh solvent to the mass being mixed, and by continuously and automatically separating the treated liquid and the solvent having in solution the matter to be extracted from the liquid to be treated from the mixture and from each other by means of their different specific gravity.

The object of the invention is to make this method more effective and more expeditious.

Hitherto the liquid to be treated and the solvent were mixed cold. By mixing them hot the extraction of the matter to be obtained is accelerated and rendered more easy and complete, and also the following separation of the liquids is greatly facilitated.

According to this invention the liquid to be treated before undergoing the hitherto usual operations is heated by being mixed with vapors of the solvent, which are thereby condensed. Vapors of the solvent remaining uncondensed escape to a cooler, and after having been liquefied there are used for freeing or washing the treated liquid from small particles of the solution in the solvent of the matter to be obtained. The hot mixture of liquid under treatment and of solvent which has already dissolved the whole or nearly the whole quantity of the matter to be extracted passes then into solvent, which has already undergone the operation and has separated from the treated liquid and to which the solvent contained in the hot mixture combines, while the liquid under treatment contained in the mixture and being suspended in a large surplus of the solvent is further treated and then separates easily from the latter.

When the liquid to be treated is of a muddy or slushy nature or when the extraction of the matter to be obtained is otherwise more difficult, the hot mixture of liquid being treated and of solvent is very finely divided within the already used solvent the mixture enters. The treated liquid having separated from the mixture is always washed by fresh solvent. If the quantity of liquid solvent obtained by condensing the vapors escaping while heating the liquid to be treated is insufficient for this purpose, other fresh liquid solvent is employed.

In some cases, especially when the liquid to be treated forms a sludge or sludge-like mass, already in the beginning fresh liquid solvent, besides its vapors, is mixed with the liquid to be treated, as then the extraction is more effective. The treated liquid and the solvent having the matter to be obtained in solution are kept hot also during the separation in cases in which it otherwise is difficult.

Any appliance in which the liquid to be treated and the due amount of vapors of the solvent or the liquid to be treated and the due quantity of liquid solvent and of vapors of the solvent can be mixed, and any means for keeping, if so desired, the mixture and the separating liquids hot until the treatment is completed may serve for carrying out this invention when connected to any suitable apparatus for the continuous extraction of matter from liquids.

For more minutely explaining the invention I describe now by way of example the continuous extraction from water of grease, essential oil, or any other matter obtainable by this process by benzene, the solvent being in this case lighter than the liquid to be treated. A sectional elevation of the apparatus which I use for this purpose is diagrammatically shown in the accompanying drawing.

The apparatus shown forms no part of my present invention.

1 is a vertically-arranged cylindrical vessel forming the mixer for the liquid to be treated and the vapors of the solvent.

2 is the inlet-pipe for the liquid to be treated, and 3 the inlet-pipe for the vapors of the solvent.

4 is a pipe through which, if necessary or desirable, fresh liquid benzene is introduced into the mixer 1.

5 is an agitator.

6 is the overflow-pipe leading the hot mixture of the liquid under treatment and of the solution in solvent of the matter to be obtained to the chamber 7. At the top, sufficiently high above the overflow-pipe 6 and the level of the mixture of liquids as to prevent foam or liquid thrown up by escaping vapors from entering, the mixer 1 is fitted with the pipe 8, leading the vapors remaining uncondensed in the mixer 1 to the cooler 9, which is so constructed that all the liquid condensed leaves it through the pipe 10, ending in the distributer 12 within the chamber 7.

The chamber 7 consists of a vertically-arranged and cylindrical vessel so constructed and adapted as to serve as the well-known extraction-chamber for the continuous extraction of matter from liquids by solvents on the counter-current principle.

11 is the distributer for the heavier liquid. It serves in this case where the liquid to be treated is the heavier one for the distribution of the hot mixture entering the chamber 7 through the pipe 6.

12 designates the distributer for the lighter liquid, in this case the solvent entering into 7 through the pipe 10. The pipe 10 is provided with the pipe 13, through which fresh liquid solvent may be led into the chamber 7 from a reservoir.

14 represents an agitator.

15 is the outlet-pipe for the lighter liquid, and as this liquid is in this case the solvent the pipe 15 is connected to the still 18.

16 represents the outlet-pipe for the heavier liquid, the overflow-point of which is arranged so high above the bottom of the chamber 7 that the column of the heavier liquid contained in the pipe 16 between the level of the chamber-bottom and the overflow-point balances the columns of the heavier and of the lighter liquid within the chamber 7 between its bottom and the outlet-pipe 15 for the lighter liquid.

The chamber 7 is shown as surrounded by a jacket 17, which may be constructed as a hot-water or steam jacket or formed of silicate cotton or any other suitable insulating material.

18 represents the still for the solution of the matter obtained. The still is heated by the steam-coil 19, is fitted with the outlet-pipe 20 and the vapor-pipe 21, and connected at its lower part to the pipe 15, leading the solution of the matter obtained from the chamber 7 into the still. The pipe 15 is provided with the stop-cock 22 and being bent upward forms a liquid seal, preventing the escape of vapors from the still into the chamber 7. By regulating the three-way cock 23, attached to the vapor-pipe 21, the vapors escaping from the still may be led either through pipe 3 into the mixer 1 or through pipe 24 to a condenser.

The still 18 is arranged in regard to the mixer 1 and the chamber 7 in such a way that the column of liquid contained in the pipe 15, forming a liquid seal, has so great a vertical height that the vapors when entering the mixer 1 can overcome the pressure they encounter therein.

The mixer 1, the chamber 7, and the still 18 are fitted with test-cocks, gage-glasses, sight-holes, thermometers, and other fittings usual in apparatus of this kind.

When, contrary to the case shown in the drawing, the liquid to be treated—for instance, water containing the matter to be obtained—has a smaller specific gravity than the solvent—for instance, chloroform or carbon disulfid—the overflow-pipe 6 of the mixer 1 is connected to the distributer 12, the pipe 10 to the distributer 11, and the still 18 to the outlet-pipe 16 for the heavier liquid. In both cases, may the liquid to be treated be heavier or lighter than the solvent, the improved treatment is exactly the same.

For the example mentioned above the extraction from water of grease, essential oil, or any other matter obtainable in this way by benzene the method of operation is as follows: All the cocks and valves of the apparatus having been duly regulated and the agitators set into motion, the water containing the grease, essential oil, or other matter (hereinafter referred to as the "water solution") is introduced into the mixer 1 through the pipe 2, while the vapors of the solvent—the benzene evaporated in the still 18—enter the mixer 1 through the pipes 21 and 3. If it is necessary or desirable for the success of the operation, also fresh liquid solvent is led into the mixer 1 through the pipe 4. The benzene-vapors and, if employed, the liquid benzene entering the mixer 1 meet, rise, and by means of the powerful agitator 5 are distributed within and most intimately mixed with the cold-water solution, whereby the benzene-vapors are partly condensed and the water solution and the liquid benzene, if such is used, are heated. While being intimately mixed with the hot-water solution, the hot liquid benzene, wholly or partly formed by the condensation of the vapors, easily dissolves the grease, essential oil, or other matter to be extracted. The hot mixture of the benzene solution of the matter to be obtained and of the water solution under treatment passes then from the mixer 1 through the overflow-pipe 6 and the distributer 11 into the bulk of the benzene solution contained in the upper part of the chamber 7 and supported therein by the bulk of the already-treated water solution. The benzene solution contained in the hot mixture assimilates then with the bulk of the benzene solution contained in the chamber 7 and consisting partly of benzene solution obtained in the mixer 1 and partly of benzene having only served for freeing or washing the treated water solution contained in the lower part of the chamber 7 above the distributer 12 from small particles of the benzene solution of the matter obtained. The water solution contained in the hot mixture entering the chamber 7 passes in a finely-divided state downward through the bulk of the benzene solution contained in the upper part of 7 and is thus acted upon by a very large surplus of the solvent, by which treatment not only the extraction, if not yet finished in the mixer 1, is completed, but also the quick separation of the treated water solution from the benzene solution, with which it was most intimately mixed in the mixer 1, is secured. The water solution combines then with the bulk of the already-treated water solution in the lower part of the chamber 7. The benzene-vapors remaining uncondensed in the mixer 1 escape through the pipe 8 into the condenser 9, where they are also condensed. The condensed benzene enters then through the pipe 10 and the distributer 12 into the bulk of the treated water solution, which is thus finally washed by the fresh benzene passing in a finely-divided state upward until it combines with the bulk of the benzene solution contained in the upper part of 7. If the quantity of liquid benzene obtained by the condensation of the vapors escaping from the mixer 1 is insufficient for properly washing the water solution, as described, a further amount of fresh liquid benzene is introduced into the apparatus through the pipe 13. By gently moving the agitator 14 the extracting, washing, and separating operations taking place in the zone between the distributers 11 and 12 of the chamber 7 are greatly assisted.

The completely-treated water solution separates from small particles of fresh solvent in the zone below the distributer 12 and leaves then the apparatus through the pipe 16. The obtained benzene solution of the matter extracted from the water solution separates from small particles of the latter in the zone above the distributer 11 and leaves then the chamber 7 through the pipe 15 for the still 18, in which the benzene is evaporated and the extracted matter gathers.

The jacket 17 serves for keeping the liquids contained in the chamber 7 hot, whereby the operations taking place therein are accelerated and made more effective. In most cases it is sufficient to form the jacket 17 of any suitable insulating material; but if also the effect of the cold fresh solvent entering the chamber 7 is to be counteracted the jacket 17 must be constructed as a hot-water or steam jacket.

After a sufficient quantity of extracted matter has been accumulated in the still 18 the cock 22, attached to the pipe 15, leading the benzene solution of the extracted matter from the chamber 7 into the still, is shut off, and the three-way cock 23 is so regulated that the vapor cannot enter through the pipe 3 into the mixer 1, but passes through the pipe 24 to an ordinary condenser, the condensed benzene gathering in a reservoir. As soon as all the benzene has been evaporated from the extracted matter the latter is drawn from the still by opening the cock 20. The still is then charged with fresh benzene, the cock 22 is reopened, and the three-way cock 23 turned so that the vapors again enter the mixer 1. If the interruption thus caused in the extraction by emptying the still from extracted matter is to be avoided, two stills must be used.

If the extraction of the matter to be obtained is already completed in the mixer 1 and the separation of the treated liquid from the solution in solvent of the extracted matter is easily effected, the distributer 11 and the agitator 14 may be dispensed with.

Having thus described my invention, what I claim, and desire to secure by Letters Patent, is—

1. The herein-described improved process of continuously extracting matter from liquids by solvents, which consists in intimately mixing the liquid to be treated with vapors of the solvent which are partly condensed thereby, the liquid to be treated getting hot and the matter to be obtained being extracted therefrom by the likewise hot condensed solvent, in passing the hot mixture of the solution in solvent of the extracted matter and of the liquid under treatment into solvent consisting of the solution of the extracted matter and of fresh solvent having only served for washing the treated liquid, in separating the produced solution in solvent of the extracted matter from the treated liquid by means of their different specific gravities, in washing the latter liquid with fresh solvent and in evaporating the solvent in which the extracted matter has been dissolved.

2. The herein-described improved process of continuously extracting matter from liquids by solvents, which consists in intimately mixing the liquid to be treated with vapors of the solvent which are partly condensed thereby, the liquid to be treated getting hot and the matter to be obtained being extracted therefrom by the likewise hot condensed solvent, in passing the hot mixture of the solution in solvent of the extracted matter and of the liquid under treatment into solvent consisting of the solution of the extracted matter and of fresh solvent having only served for washing the treated liquid, in separating the produced solution in solvent of the extracted matter from the treated liquid by means of their different specific gravities, in washing the latter liquid with the fresh solvent formed by the condensation of the vapors escaping uncondensed while being mixed with the liquid to be treated and in evaporating the solvent in which the extracted matter has been dissolved, the produced vapors being mixed again with fresh liquid to be treated.

3. The herein-described improved process of continuously extracting matter from liquids by solvents, which consists in intimately mixing the liquid to be treated with liquid solvent and with vapors of the solvent whereby the latter are partly condensed, the liquid to be treated and the liquid solvent added getting hot and the matter to be obtained being extracted by the hot solvent, in passing the hot mixture of the solution in solvent of the extracted matter and of the liquid under treatment into solvent already used in the extraction, in separating the liquids from each other by means of their different specific gravities, in washing the treated liquid with fresh solvent and in evaporating the solvent in which the extracted matter has been dissolved.

4. The herein-described improved process of continuously extracting matter from liquids by solvents, which consists in intimately mixing the liquid to be treated with vapors of the solvent whereby the latter are partly condensed, in passing the thus-produced hot mixture of the solution in solvent of the extracted matter and of the liquid under treatment into solvent already used for the extraction, in separating the liquids from each other and washing the treated liquid with fresh solvent, the liquids being kept hot throughout the operations, and finally in evaporating the solvent in which the extracted matter has been dissolved.

5. The herein-described improved process of continuously extracting matter from liquids by solvents, which consists in intimately mixing the liquid to be treated with vapors of the solvent whereby the latter are partly condensed and the liquid to be treated gets hot, in finely dividing the thus-produced hot mixture of the solution in solvent of the extracted matter and of the liquid under treatment within and intimately mixing it with a large surplus of solvent already used for the extraction, in separating the liquids from each other according to their specific gravities under the assistance of movement, in washing the treated liquid by mixing it with fresh solvent and in evaporating the solvent, in which the extracted matter has been dissolved, the produced vapors being mixed again with fresh liquid to be treated, and the vapors remaining uncondensed thereby being separately condensed and serving to wash the treated liquid, as set forth.

In testimony whereof I have signed my name to this specification in the presence of two subscribing witnesses.

LOUIS CHARLES REESE.

Witnesses:
PERCY THORPE CONRATH,
FREDK. J. NAYLOR.